(12) United States Patent
Ganz et al.

(10) Patent No.: US 6,403,010 B1
(45) Date of Patent: Jun. 11, 2002

(54) METHOD FOR INJECTING PLASTIC MATERIAL

(75) Inventors: Martin Ganz, Katzelsdorf (CH); Harald Bleier, Wiener Neustadt (AT)

(73) Assignee: Battenfeld GmbH, Meinerzhagen (DE)

( * ) Notice: Subject to any disclaimer, the term of this patent is extended or adjusted under 35 U.S.C. 154(b) by 0 days.

(21) Appl. No.: 09/292,040

(22) Filed: Apr. 14, 1999

(30) Foreign Application Priority Data

May 4, 1998 (DE) .......................................... 198 19 833

(51) Int. Cl.⁷ .............................................. B29C 45/54
(52) U.S. Cl. ............................ 264/328.1; 264/328.19; 425/557; 425/559; 425/561
(58) Field of Search ............................ 264/328.1, 328.8, 264/328.19; 425/557–559, 561

(56) References Cited

U.S. PATENT DOCUMENTS

| | | | |
|---|---|---|---|
| 2,359,840 A | * | 10/1944 | Goessling |
| 2,881,477 A | * | 4/1959 | Triulzi |
| 3,253,303 A | * | 5/1966 | Bradt |
| 3,299,475 A | * | 1/1967 | Carlson et al. |
| 3,516,123 A | * | 6/1970 | Lang et al. |
| 5,785,999 A | | 7/1998 | Takayama et al. .......... 425/130 |

FOREIGN PATENT DOCUMENTS

| | | | |
|---|---|---|---|
| CA | 745536 | * 11/1966 | |
| DE | AS 1142 229 | 1/1963 | ............. B29F/1/00 |
| DE | 31 00 705 A1 | 11/1981 | ............. B29F/1/02 |
| DE | 197 03 628 A1 | 10/1997 | ........... B29C/45/46 |

OTHER PUBLICATIONS

Rosato et al., Injection Molding Handbook second edition, 1995, published by Chapman &Hall, pp. 154–157 and 183–186.*

* cited by examiner

Primary Examiner—Jill L. Heitbrink
(74) Attorney, Agent, or Firm—Hamilton, Brook, Smith & Reynolds, P.C.

(57) ABSTRACT

A method for injecting plastic material or another injectable material into an injection molding tool comprises the following steps: plasticizing the plastic or other injectable material in a plasticizing apparatus (2); transporting the plasticized plastic or the plasticized other injectable material into a dosing apparatus (3), which has a fluidic connection (4) to the plasticizer apparatus (2), and specifically in essentially precisely the quantity that is to be introduced into the injection molding tool (1); transporting the plasticized plastic or the plasticized other injectable material, essentially in that quantity which is to be introduced into the injection molding tool (1), from the metering apparatus (3) into an injection apparatus (5), via a fluidic connection (6), while at the same time preventing the plastic or other injectable material from backflowing from the metering apparatus (3) into the plasticizing apparatus (2); injecting the entire quantity of plastic or the entire quantity of another injectable material, which is situated in the injection apparatus (5), into the injection molding tool (1), while at the same time preventing the plastic or the other injectable material from flowing from the injection apparatus (5) back into the metering apparatus (3). In this way the production of small and ultra-small injection molded parts is facilitated, and the injection of a reproducibly precise quantity of melt is accomplished.

6 Claims, 5 Drawing Sheets

METHOD FOR INJECTING PLASTIC MATERIAL

BACKGROUND OF THE INVENTION

In the process of injection molding plastics, plasticizers and injection apparatuses are customarily used. Typically, a plasticizer and an injection molding screw plasticize plastic material. The melt is then injected into an injection molding tool by an axial movement of the screw. To prevent the melt from backflowing during the injection process, a non-return valve is usually disposed at the end of the screw.

Recently, the demand for dimensionally small injection-molded parts has increased. Common examples of such parts include micro-mechanical components (e.g., micro gear wheels for watches), medical-technical hardware, and optoelectronic elements (e.g., parts for optical waveguides).

SUMMARY OF THE INVENTION

The production of these small part encounters problems when manufactured with classical injection molding machines, however. The problem relates to the small amounts of hot thermoplastic that must be injected into the usually cold mold. This necessarily results in a critical thermal transition region in the end region of the screw or in the nozzle region.

The present invention is directed to avoiding this thermal transition region or minimizing its effect, especially when injection molding small injection molded parts, to achieve precise metering of the quantity of injection-molding material, such as plastic, which is injected. Specifically, the inventive method and an apparatus can produce and deliver even the smallest quantities of melt to yield small and even ultra-small molded parts by precisely controlling the dose. The pressure buildup here preferably occurs as close to the cavity as possible.

In general, according to one aspect, the invention features a method for injecting plastic material or other injectable material into an injection molding tool. The method comprises plasticizing or melting the plastic or other injectable material in a plasticizing, or similar, apparatus. The material is then transported into a dosing. or metering, apparatus, which has a fluidic connection to the plasticizer apparatus. Preferably, the amount of material is essentially precisely the quantity that is to be introduced into the injection molding tool. The material is then transported, essentially in that quantity which is to be introduced into the injection molding tool, from the metering apparatus into an injection apparatus, via a fluidic connection, while at the same time the material is prevented from flowing from the metering apparatus back into the plasticizing apparatus. The entire quantity injectable material, which is situated in the injection apparatus, is injected into the injection molding tool, while at the same time the material is prevented from flowing from the injection apparatus back into the metering apparatus.

Preferably, provision is here made that the injectable material that is situated in the injection apparatus is temperature-stabilized in such a way that it remains a liquid melt.

In general, according to another aspect, the invention also features an apparatus for injecting plastic material or other injectable material into an injection molding tool. The apparatus comprises a plasticizing apparatus, in which plastic material or another injectable material is plasticized. A fluidic connection is provided between the plasticizing apparatus and a metering apparatus. The metering apparatus functions to take-up a prescribed quantity of injectable material. Preferably, an element, such as a non-return valve, is disposed in the connection, to prevent the injectable material from backflowing. A fluidic connection is also provided between the metering apparatus and an injection apparatus. The injection apparatus receives the injectable material that is to be injected into the molding tool before it is injected. The quantity of injectable material that is transported into the injection apparatus essentially corresponds to the quantity that is to be introduced into the injection molding tool, in the preferred embodiment. Finally, means is provided to prevent the injectable material from flowing from the injection apparatus back into the metering apparatus.

In the preferred embodiment, the means that prevents the injectable material from flowing from the injection apparatus back into the metering apparatus is implemented by an injection piston, which blocks the fluidic connection between the metering apparatus and the injection apparatus during the injection process.

Also, preferably, the means to prevent the injectable material from flowing from the injection apparatus back into the metering apparatus is implemented using an injection piston, which blocks the fluidic connection between the metering apparatus and the injection apparatus during the injection process.

Finally, the injection apparatus is ideally surrounded by temperature-stabilizing heaters, for example, at least in part, which prevents solidification of the melt.

In summary, the inventive method and design advantageously achieve a pressure buildup in the melt during the injection process that occurs very close to the cavity. This results in a higher quality injection molding process, since the method and apparatus make it possible to meter and measure exactly the injected plastic, while at the same time reducing or controlling the thermal transition.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE INVENTION

Figure 1:
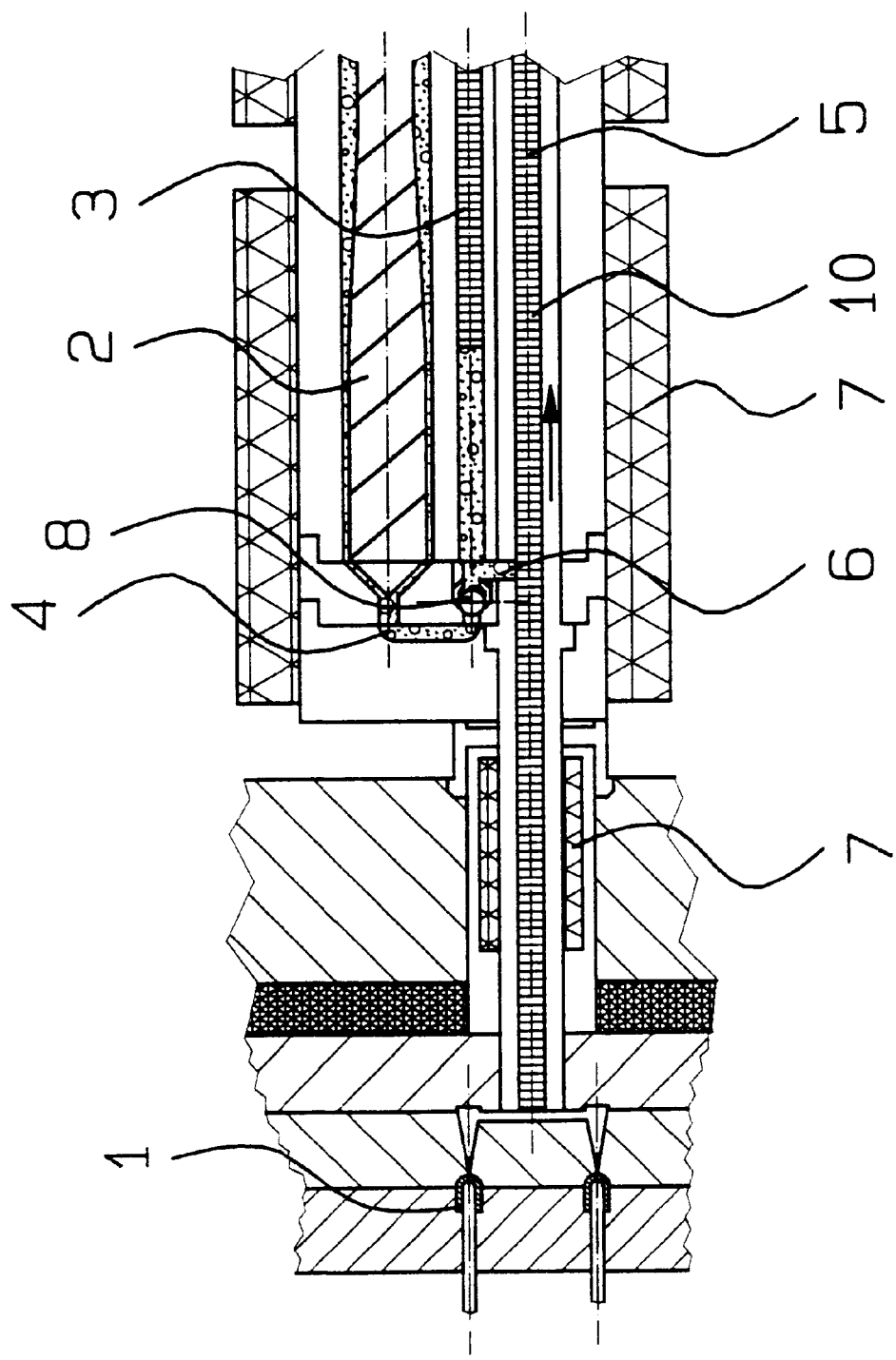
FIG. 1 schematically shows a cross-section of a plasticizing and injection apparatus for plastic or other injectable material, in a first stage of the process, according to the invention.

FIG. 1 shows an injection molding apparatus, which has been constructed according to the principles of the present invention, in its first process stage.

An injection molding tool 1 has a cavity, into which melted plastic is to be injected, so as to produce a molded part. For this purpose, plastic granulate or powder is melted in a screw-plasticizer unit 2, in well-known fashion. The plastic melt passes through a line 4 (a first fluidic connection) into a metering apparatus 3. The metering apparatus 3 essentially comprises a piston-cylinder unit, into which that quantity of plastic melt is introduced. The quantity of the melt is controlled as precisely as possible, to be that which is needed to produce a molded part.

In one implementation, the apparatus is designed so that the motion of the piston of the metering apparatus 3 is detected such as by an encoder and supplied to a machine controller, and the plasticizing process in the plasticizer unit 2 is interrupted by the controller as soon as the piston has reached the desired position (taking into account the temperature and pressure); the precise and required quantity of melt is then in the metering unit 3. In every case, it is important that, before initiating further steps, a precisely defined quantity of melt has been taken in by the metering apparatus.

During the metering process, i.e., while the melt is introduced into the metering apparatus 3, the injection piston 10 of an injection apparatus is in such an advanced position that no melt flows through the line (a second fluidic connection) 6 from the metering apparatus 3 into the injection apparatus 5.

Figure 2:
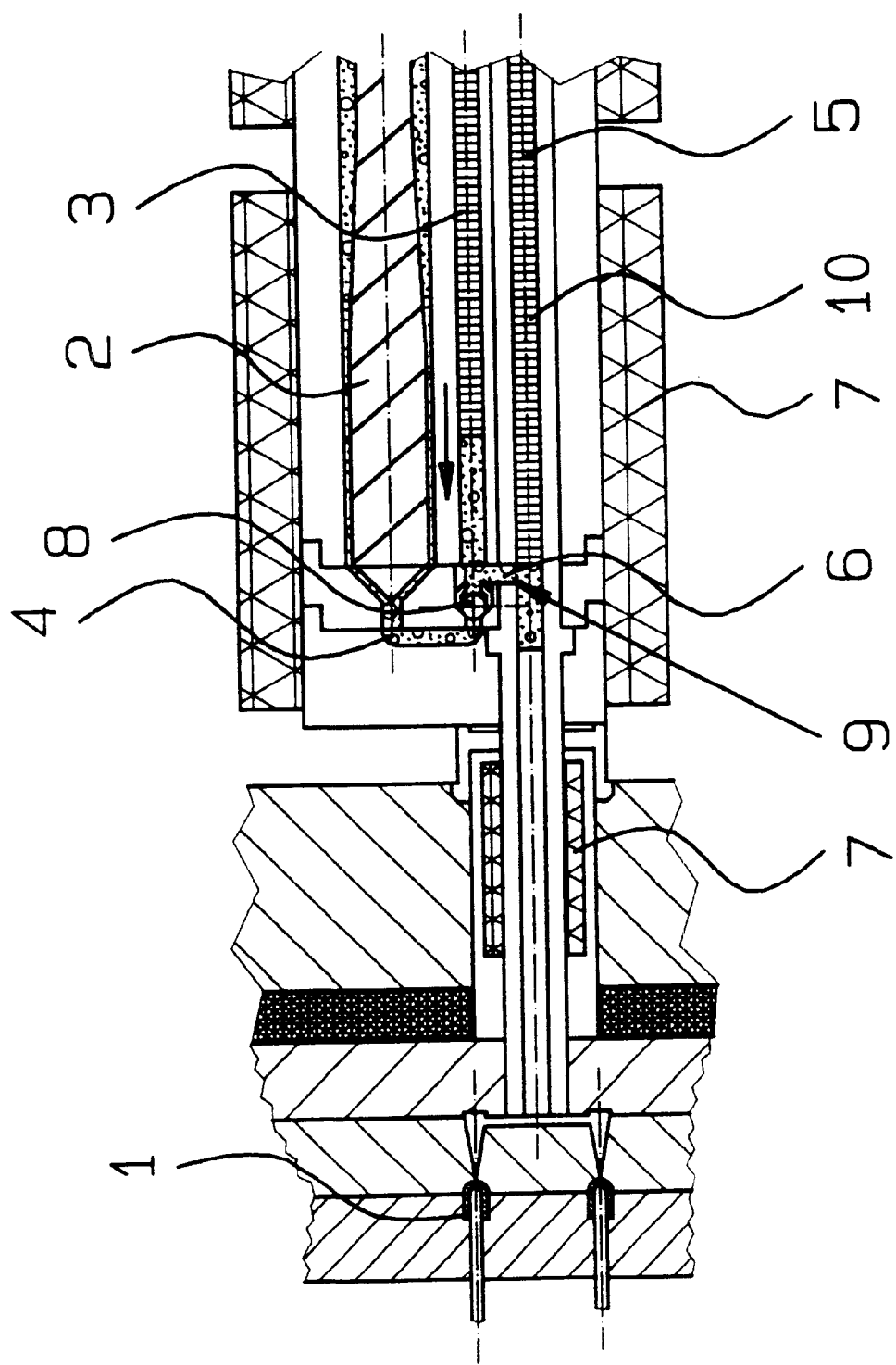
FIG. 2 shows the same structure at a later time.

FIG. 2 shows the next stage of the process. Now, the injection piston 10, which injects the melt into the mold 1, is pulled-back by the controller (see also the arrow in FIG. 1), so that the second fluidic connection 6 between the metering apparatus 3 and the injection apparatus 5 is enabled or established: This allows melt to flow from the metering apparatus 3 into the injection apparatus 5.

Backflow of the melt from the metering apparatus 3 into the plasticizing apparatus 2 is prevented by a non-return valve 8 in the first fluidic connection 4 between the plasticizer apparatus 2 and the metering apparatus 3.

Since the precise quantity of melt has been stored in the metering apparatus 3 that is required to produce the molded part, activation of the piston of the metering apparatus 3 (see arrow in FIG. 2) causes exactly this quantity to be expelled, through the line 6, into the cylinder of the injection apparatus 5.

Figure 3:
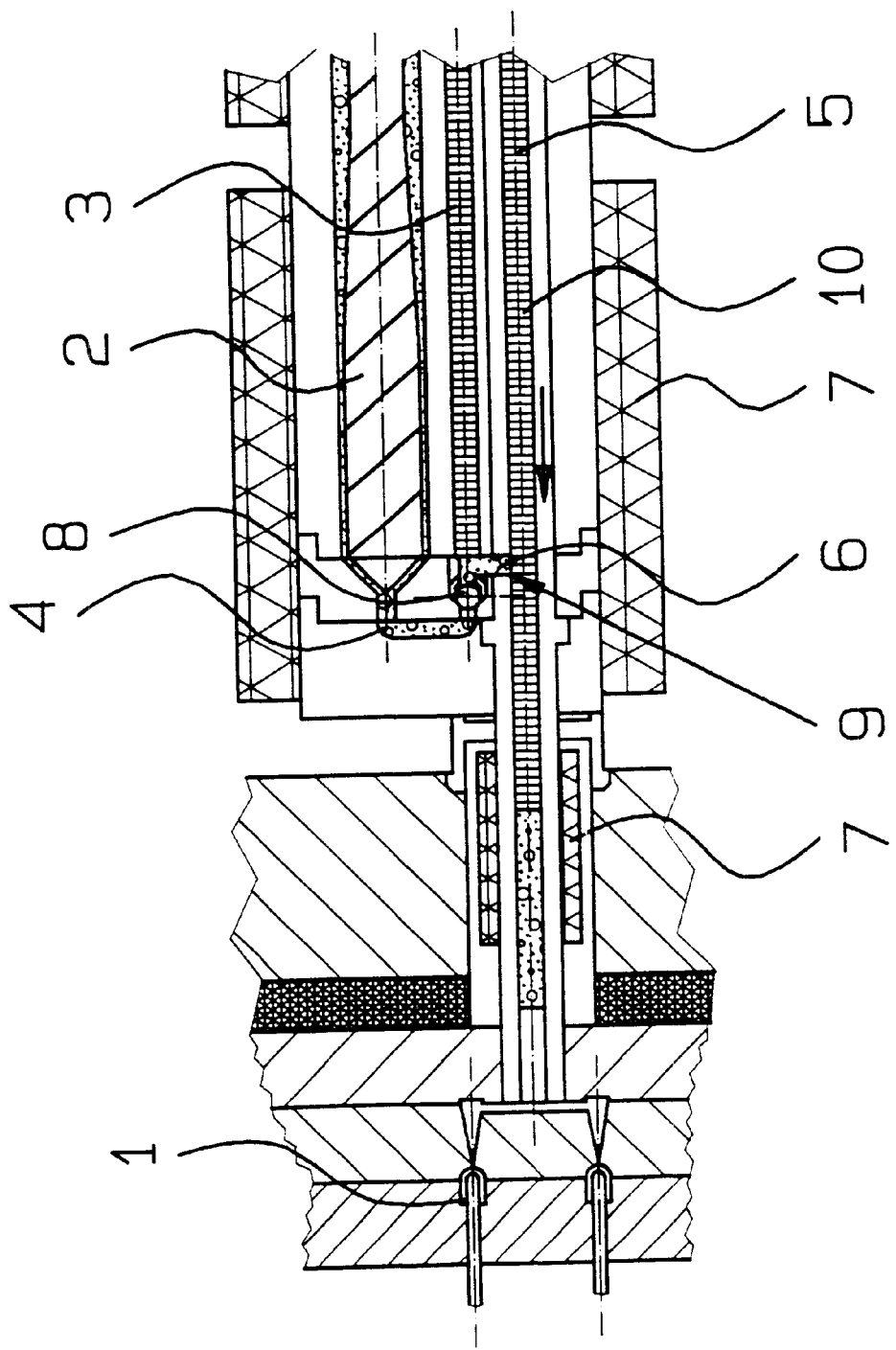
FIG. 3 shows the structure at a still later time.

FIG. 3 shows a later stage of the process. The quantity of melt stored in the metering apparatus 3 has been completely expelled into the injection apparatus 5. Consequently, the piston of the metering apparatus 3 is now in its foremost position. The melt situated in the injection apparatus 5, which preferably corresponds exactly to the quantity which is needed to produce a molded part, is then injected into the mold 1 by the injection piston 10 of the injection apparatus 5 (see arrow in FIG. 3).

The geometric arrangement of the injection apparatus 5 and especially of its piston 10 achieves the result that, when the melt is expelled from the injection apparatus 5 into the mold cavity, the melt is prevented from flowing back into the metering apparatus. After the connection 6 has been passed, the piston actually blocks this connection and then forms the means 9 to prevent the melt from flowing back in the preferred embodiment. Other techniques or systems, however, may be used for this purpose such as controlling the relative pressures or non-return valves.

In one implementation, an injection apparatus comprises anpparatus to actuate an injection element as described in patent application Ser. No. 09/291,398, filed on a common date, by Gruber, et al., which is incorporated herein in its entirety by this reference.

Figure 4:
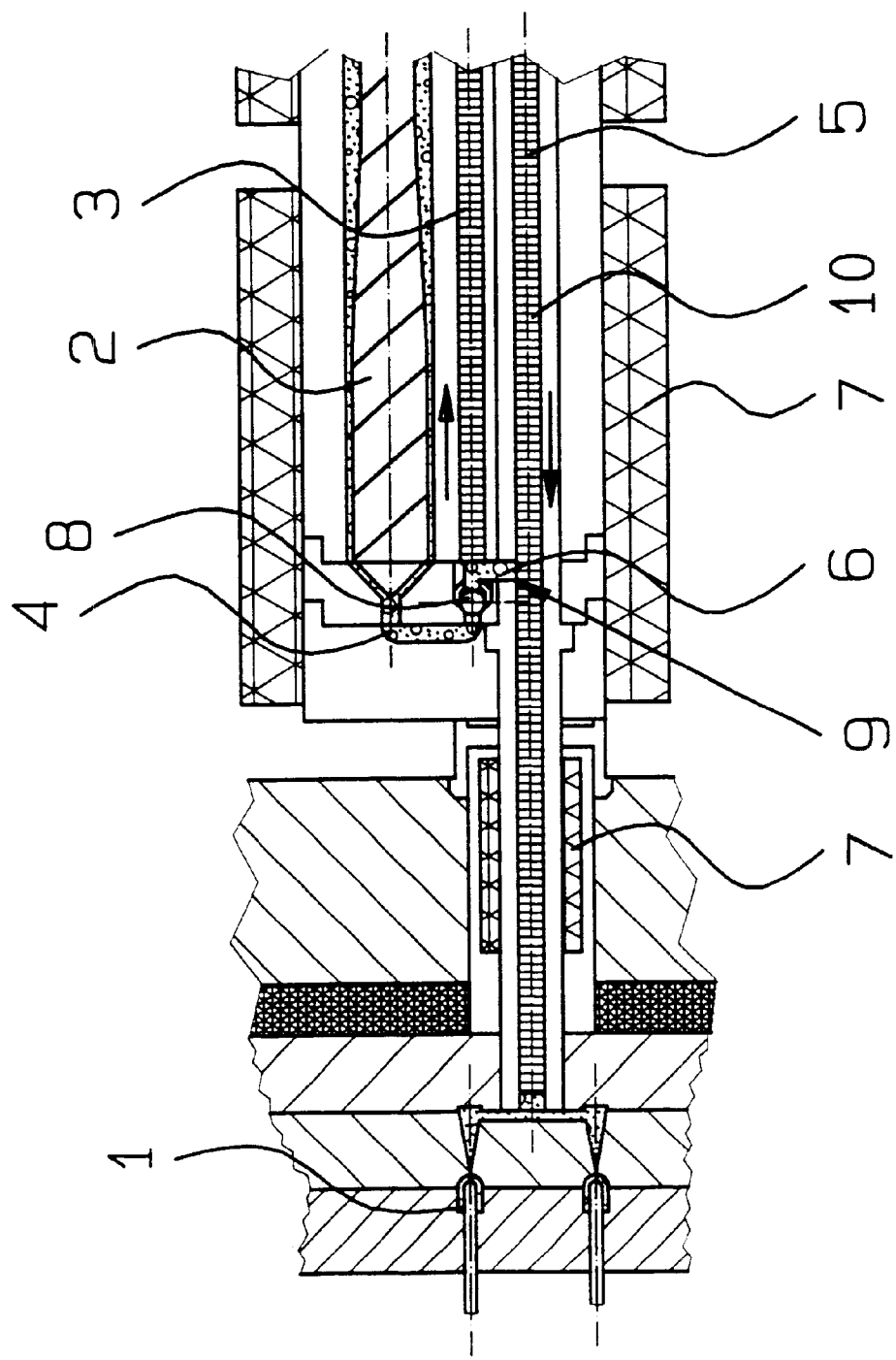
FIG. 4 shows the structure at a still later time.

As FIG. 4 shows, the piston 10 of the injection apparatus 5 is pushed forward so far that it expels all the plastic material situated in the injection apparatus 5. As further shown, preparation of the next shot is already begun: The plasticizing apparatus 2 is already again producing plastic melt, which is expelled into the metering apparatus 3 (see arrow above the metering apparatus 3).

As can further be seen in all the figures, heating elements or temperature-stabilizing devices 7 are present, which surround at least parts of the apparatus, to ensure that the melt cannot "freeze" in the apparatus or in its parts.

Figure 5:
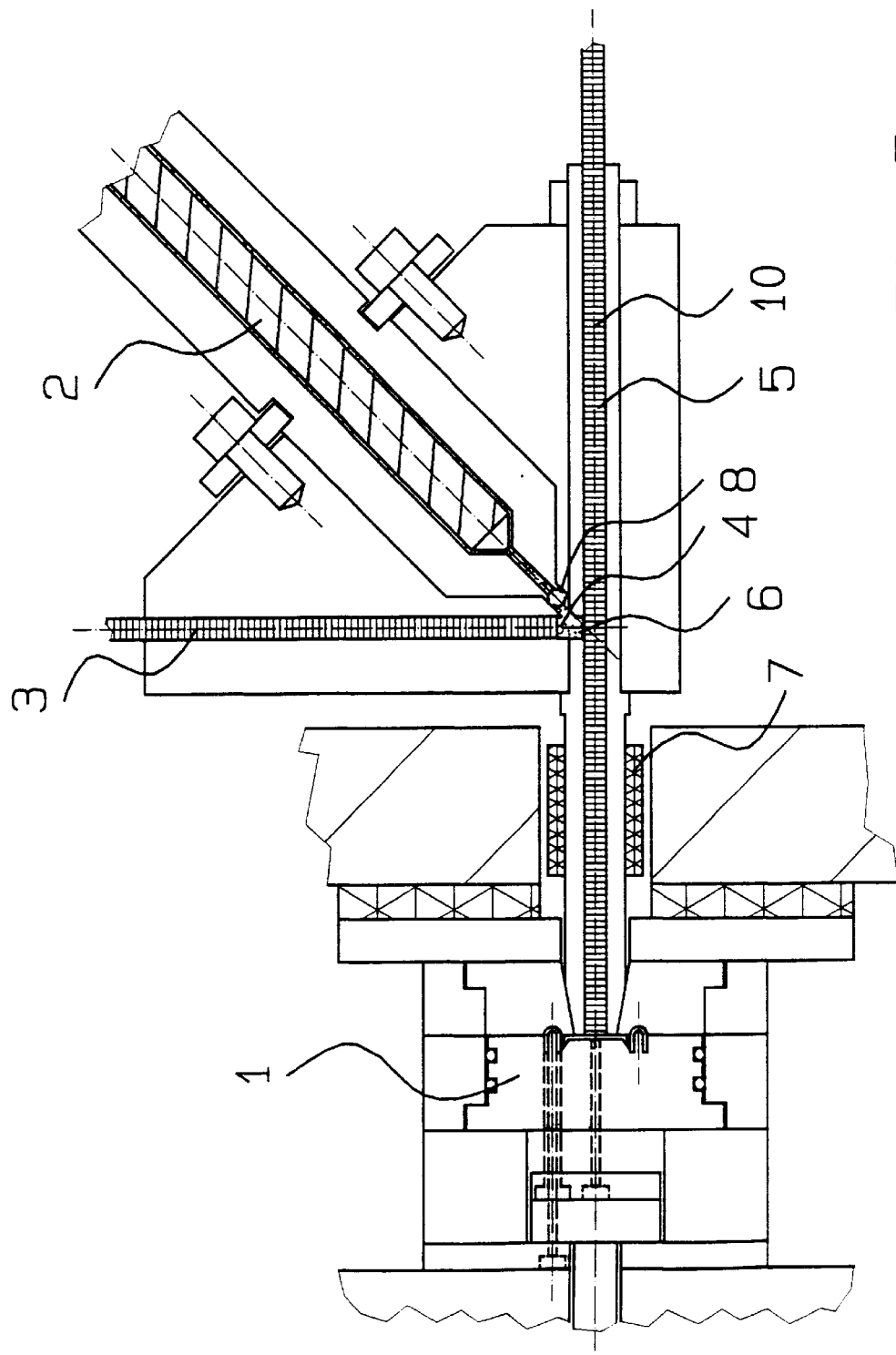
FIG. 5 shows an alternative design of the plasticizing and injection apparatus.

FIG. 5 shows another embodiment of the apparatus. In principle, this apparatus operates precisely like the one shown in FIGS. 1 to 4. However, as can be observed, the plasticizing apparatus 2, the metering apparatus 3, and the injection apparatus 5 are disposed at an angle to one another, and specifically in such a way that the three units 2, 3, and 5 work toward a common intersection point, which is situated at the point where the longitudinal axes of the three units meet.

For demolding the finished injection-molded parts from the mold or from the gate, the design can be such that the injection piston 10 executes a short push motion, and thus takes over the function of an ejector.

While this invention has been particularly shown and described with references to preferred embodiments thereof, it will be understood by those skilled in the art that various changes in form and details may be made therein without departing from the spirit and scope of the invention as defined by the appended claims. For example, the inventive method and the inventive apparatus are also well suited to process other injectable materials, such as e.g. metal; the invention thus is not limited to the processing of plastics.

What is claimed is:

1. A method for injecting material into an injection molding tool, comprising:

providing a plasticizer unit with a longitudinal axis, a metering apparatus with a longitudinal axis and an injection apparatus with a longitudinal axis, each longitudinal axis being disposed at an angle to one another and meeting at a fluidic connection;

melting the material in the plasticizer unit;

transporting the material from the plasticizer unit into the metering apparatus via the fluidic connection;

metering in the metering apparatus a precise quantity to be introduced into the molding tool;

transporting the material, in the quantity which is to be introduced into the molding tool, from the metering apparatus into the injection apparatus, via said fluidic connection, while at the same time preventing the material from backflowing from the metering apparatus to the plasticizer unit, the metering apparatus having a uniform width in communication with and substantially all the way to the injection apparatus; and injecting the material, which is situated in the injection apparatus in the quantity to be introduced in the molding tool, into the molding tool, while at the same time preventing the material from flowing from the injection apparatus back into the metering apparatus.

2. A method as described in claim 1, wherein the material, situated in the injection apparatus, is temperature-stabilized to maintain a liquid state.

3. A method as described in claim 1, wherein the material is a plastic.

4. A method as described in claim 1, wherein the material is a thermoplastic.

5. A method as described in claim 1, wherein the step of preventing the material from backflowing from the metering apparatus comprises passing the material through a non-return valve.

6. A method as described in claim 1, wherein the step of preventing the material from flowing from the injection apparatus back into the metering apparatus comprises blocking the fluidic connection between the injection apparatus and the metering apparatus with a piston of the metering apparatus.

* * * * *